United States Patent
Nakamura

(10) Patent No.: US 9,217,842 B2
(45) Date of Patent: Dec. 22, 2015

(54) MULTI-MIRROR HELIOSTAT

(71) Applicant: MITAKA KOHKI CO., LTD., Tokyo (JP)

(72) Inventor: Katsushige Nakamura, Tokyo (JP)

(73) Assignee: MITAKA KOHKI CO., LTD., Tokyo (JP)

( * ) Notice: Subject to any disclaimer, the term of this patent is extended or adjusted under 35 U.S.C. 154(b) by 0 days.

(21) Appl. No.: 14/576,358

(22) Filed: Dec. 19, 2014

(65) Prior Publication Data

US 2015/0185433 A1 Jul. 2, 2015

(30) Foreign Application Priority Data

Dec. 26, 2013 (JP) .................................. 2013-268892

(51) Int. Cl.
*G02B 7/183* (2006.01)

(52) U.S. Cl.
CPC .................. *G02B 7/183* (2013.01); *Y02E 10/42* (2013.01); *Y02E 10/47* (2013.01)

(58) Field of Classification Search
CPC ......... G02B 7/183; Y02E 10/42; Y02E 10/47
USPC .......... 359/853, 855, 865; 126/684, 689, 696; 353/3
See application file for complete search history.

(56) References Cited

U.S. PATENT DOCUMENTS

| 3,466,119 | A | * | 9/1969 | Francia | F24J 2/10 126/602 |
| 4,172,443 | A | * | 10/1979 | Sommer | F24J 2/10 126/578 |
| 4,256,088 | A | * | 3/1981 | Vindum | F24J 2/10 126/571 |
| 4,274,712 | A | * | 6/1981 | Sintes | F24J 2/5413 359/850 |
| 5,325,844 | A | * | 7/1994 | Rogers | F24J 2/10 126/600 |
| 6,984,050 | B2 | * | 1/2006 | Nakamura | F24J 2/07 353/3 |
| 2005/0034752 | A1 | * | 2/2005 | Gross | F24J 2/38 136/246 |
| 2009/0038608 | A1 | * | 2/2009 | Caldwell | F24J 2/07 126/600 |
| 2009/0050191 | A1 | * | 2/2009 | Young | F24J 2/38 136/246 |
| 2011/0114080 | A1 | * | 5/2011 | Childers | F03G 7/06 126/601 |
| 2012/0012102 | A1 | | 1/2012 | Nakamura | |
| 2012/0279486 | A1 | * | 11/2012 | Sakai | F24J 2/16 126/600 |

FOREIGN PATENT DOCUMENTS

JP    2009-139761    6/2009

\* cited by examiner

*Primary Examiner* — Ricky D Shafer
(74) *Attorney, Agent, or Firm* — Greenblum & Bernstein P.L.C.

(57) ABSTRACT

A heliostat includes mirrors. Each mirror is supported with a frame at three points including a fulcrum and movable points. The movable points are provided with electric extendable units, respectively. The electric extendable units are separately controlled to change distances between the mirror and the frame at the movable points, thereby correcting an aberration of the mirror and always directing reflected light from the mirror toward a predetermined position.

5 Claims, 14 Drawing Sheets

_US 9,217,842 B2_

MULTI-MIRROR HELIOSTAT

BACKGROUND OF THE INVENTION

1. Field of the Invention

The present invention relates to a multi-mirror heliostat.

2. Description of Related Art

A heliostat is an apparatus having a mirror that is turned to track the sun and continuously reflect sunlight onto a given spot. One type of the heliostat employs and turns a single large mirror. Another type is a multi-mirror heliostat that employs a plurality of mirrors to form a mirror assembly and turns the mirror assembly like a single large mirror. The multi-mirror heliostat is advantageous because each mirror may involve a smaller distortion and the mirror assembly is adjustable to accurately reflect and concentrate light onto a given spot.

The multi-mirror heliostat supports the mirrors with a frame and separately adjusts the angle of each mirror so that sunlight made incident to the mirror assembly in an optical axis direction of the mirror assembly may be reflected by each mirror onto a target position. The heliostat turns the mirror assembly, in which the angle of each mirror has been adjusted, together with the frame according to movement of the sun, to continuously reflect sunlight onto the target position. A related art concerning the multi-mirror heliostat is disclosed in, for example, Japanese Unexamined Patent Application Publication No. 2009-139761.

SUMMARY OF THE INVENTION

The multi-mirror heliostat according to the related art may concentrate reflected sunlight from each mirror onto the target position if sunlight is made incident in the optical axis direction of the mirror assembly. If, however, sunlight is made incident in a direction other than the optical axis direction, reflected sunlight from each mirror does not concentrate on the target position, to provide an enlarged concentration spot. This is aberration. The aberration tends to become larger in the morning or evening when an incident angle to the optical axis of the mirror assembly is large. As the size of the mirror assembly increases, the aberration becomes larger. Due to this, the multi-mirror heliostat according to the related art is difficult to increase the size thereof.

To solve the problem of the related art, the present invention provides a multi-mirror heliostat capable of preventing aberration and increasing the size of the heliostat.

According to an aspect of the present invention, the multi-mirror heliostat has a mirror assembly and a frame that supports the mirror assembly and is turned and swung according to movement of the sun so that the mirror assembly continuously reflects and concentrates sunlight onto a predetermined position on an optical axis of the mirror assembly. The heliostat includes mirrors arranged to constitute the mirror assembly, each of the mirrors being supported on the frame at three points including a fulcrum and two movable points and extendable units arranged at the movable points on each mirror, respectively, the extendable units being separately controlled to individually change distances between the mirror and the frame at the movable points, thereby adjusting an angle of the mirror.

DESCRIPTION OF PREFERRED EMBODIMENTS

A multi-mirror heliostat according to an embodiment of the present invention will be explained with reference to FIGS. 1 to 14.

The multi-mirror heliostat 1 has ten mirrors 2. A number of such heliostats 1 are arranged in a field around a tower (not illustrated) having a target at the top thereof. Each of the heliostats 1 reflects sunlight onto the target of the tower.

Figure 8:
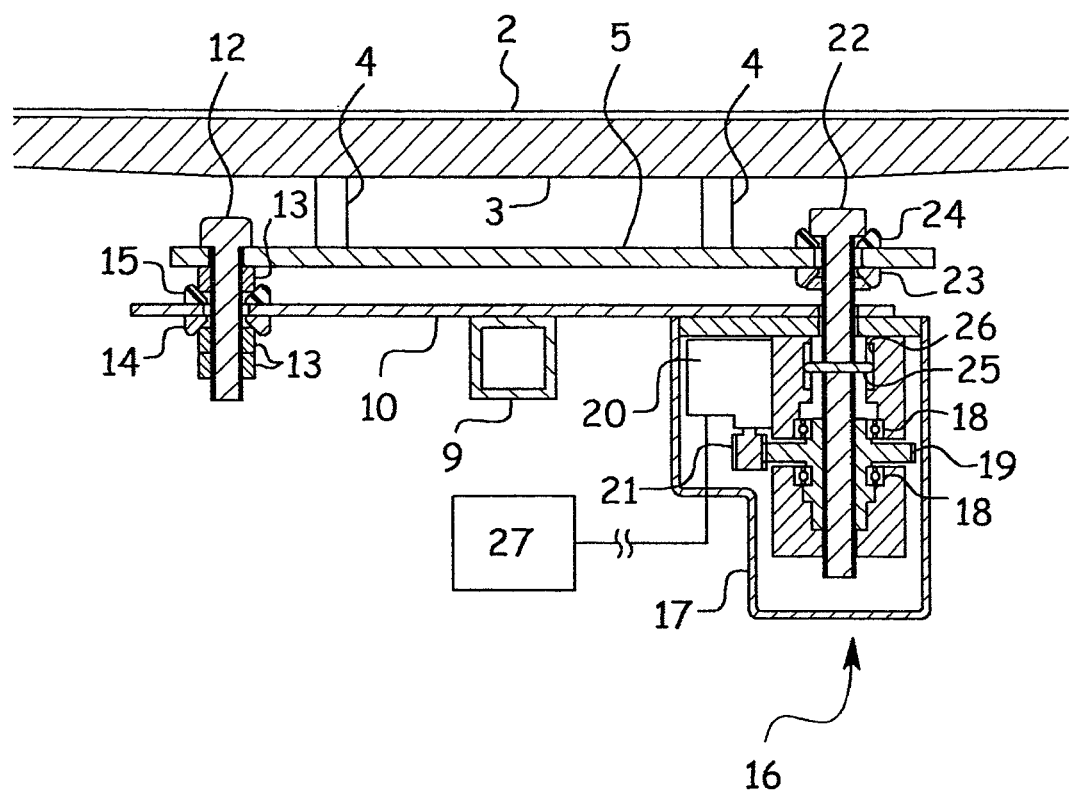
FIG. 8 is a sectional view illustrating the mirror taken along a line SA-SA of FIG. 5.

Each of the mirrors 2 of the heliostat 1 is circular having a diameter of 50 centimeters. A reflection surface of the mirror 2 is a concave (or spherical) mirror whose curvature is dependent on a substantial focal length. As illustrated in FIG. 8, the mirror 2 is bonded to a base 3 made of aluminum alloy and the back of the base 3 is supported with a spacer 4 that is fixed to a disk 5 made of metal.

The heliostat 1 has a support post 6 that is fixed to the ground. Arranged at the top of the support post 6 is a drive 7 that is turnable in a horizontal direction. From the drive 7, a rotary shaft 8 horizontally protrudes in both directions. A left arm of the rotary shaft 8 is fixed relative to a left frame 9 and a right arm of the rotary shaft 8 is fixed relative to a right frame 9. Each of the frames 9 is made of metal and has a rectangular structure (#-shaped) defined with crossing parallel members. Each frame 9 supports five mirrors 2, i.e., the two frames 9 support ten mirrors 2 in total. The frames 9 together with the mirrors 2 can be turned in azimuth and altitude directions. Namely, the heliostat 1 employs an altazimuth mount structure.

At a position where the mirror 2 is attached to the frame 9, a triangle plate 10 made of metal is fixed to the frame 9. The triangle plate 10 preferably has an equilateral triangle shape that is substantially inscribed in the circle of the disk 5.

The ten mirrors 2 supported with the frames 9 collectively constitute a mirror assembly 11 within a virtual circumcircle R. The circumcircle R has a center G (referred to as the center of the mirror assembly 11) that agrees with an intersection of an axial center of the rotary shaft 8 and an axial center of the support post 6.

Each triangle plate 10 has an inner point that is on the center G side and serves as a fulcrum A. The fulcrum A is positioned on a reference line S that radially extends from the center G of the circumcircle R of the mirror assembly 11. The fulcrum A is on the center G side relative to the center of the mirror 2 and is fixed on the disk 5. The triangle plate 10 also has two outer points serving as movable points B and C that are supported on the disk 5. The reference line S passes through a midpoint between the movable points B and C, and therefore, halves the triangle plate 10. Accordingly, a straight line connecting the movable points B and C to each other is orthogonal to the reference line S and the fulcrum A and movable points B and C are at the vertexes of an isosceles (preferably, equilateral) triangle, respectively.

Attaching the triangle plate 10 to the disk 5 (i.e., the mirror 2) at the fulcrum A and movable points B and C will be explained.

At the fulcrum A, a bolt 12, a nut 13, a metal washer 14, and a rubber washer 15 are used to fasten the triangle plate 10 and disk 5 to each other. The rubber washer 15 interposed at the fastening part allows the bolt 12 to incline relative to the triangle plate 10.

Figure 9:
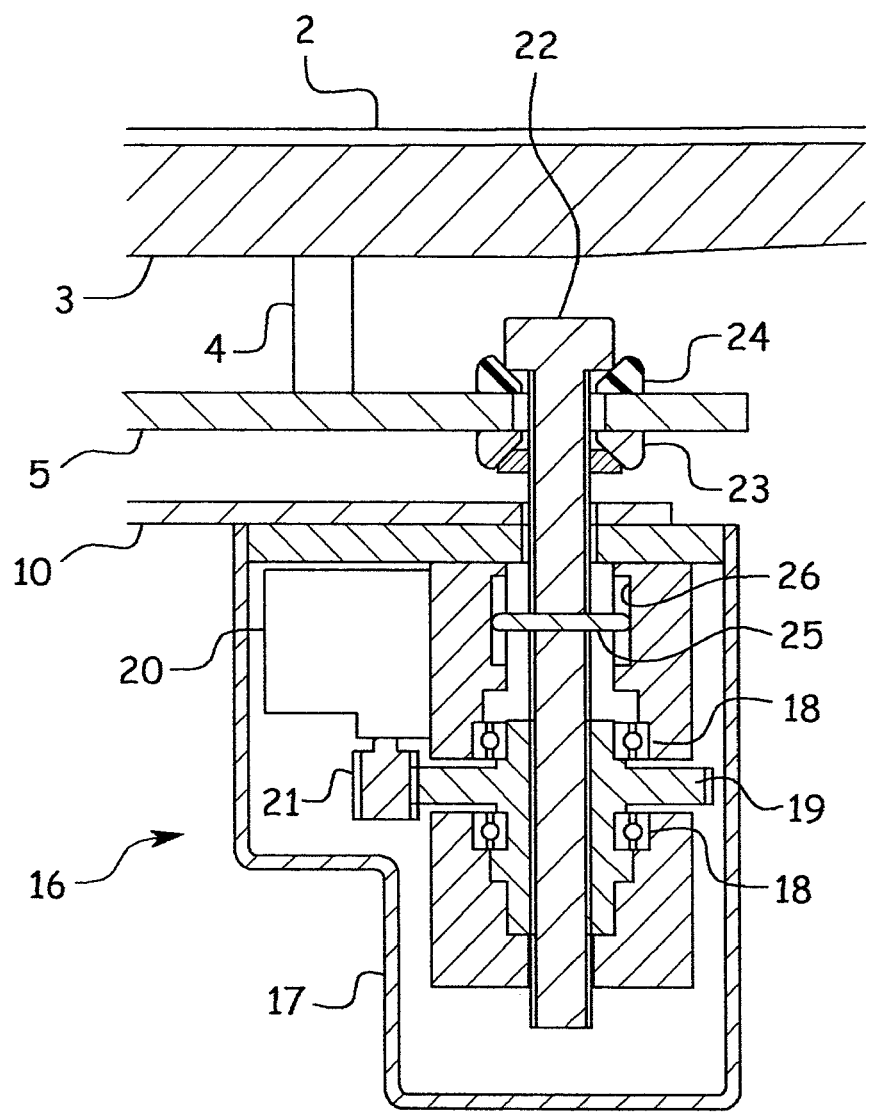
FIG. 9 is an enlarged view illustrating an electric extendable unit of the mirror.

Each of the movable points B and C is provided with an electric extendable unit 16 as a linear actuator. As illustrated in FIG. 9, a case 17 is positionally fixed to the triangle plate 10. The case 17 accommodates a nut gear 19 that is rotatable through a bearing 18. The nut gear 19 only rotates at the position and never travels. An outer gear of the nut gear 19 meshes with a gear 21 of a motor 20. An internal screw of the nut gear 19 meshes with a long bolt 22.

A head of the bolt 22 protrudes from the triangle plate 10 and is fastened to the disk 5 through a metal washer 23 and a rubber washer 24. The rubber washer 24 interposed at the fastening part allows the bolt 22 to incline relative to the disk 5. Passed through an intermediate part of the bolt 22 is a pin 25 whose each end is fitted into a thin groove 26. The engagement between the pin 25 and the thin grooves 26 allows the bolt 22 to move in a longitudinal direction and prevents the bolt 22 from turning. Namely, the pin 25 prevents rotation of the bolt 22.

The motor 20 is connected to a controller 27 that controls every heliostat 1 installed in the field. The controller 27 sends a signal to turn the motor 20 by a predetermined amount in a normal or reverse direction. When the motor 20 is turned, the nut gear 19 turns to change a protruding quantity of the bolt 22, thereby realizing the function of the electric extendable unit 16. The controller 27 allows two types of control to be carried out, i.e., manual control with the use of, for example, a joystick (not illustrated) and automatic control based on data stored in advance.

A change in the protruding quantity of the bolt 22 changes a distance between the disk 5 (i.e., the mirror 2) and the triangle plate 10 (i.e., the frame 9) at the movable point B (or C). A distance between the disk 5 and the triangle plate 10 at the fulcrum A is fixed, and therefore, changing distances at the movable points B and C results in freely changing an angle of the mirror 2 within a predetermined solid angle.

Operation of the heliostat 1 will be explained.

Figure 1:
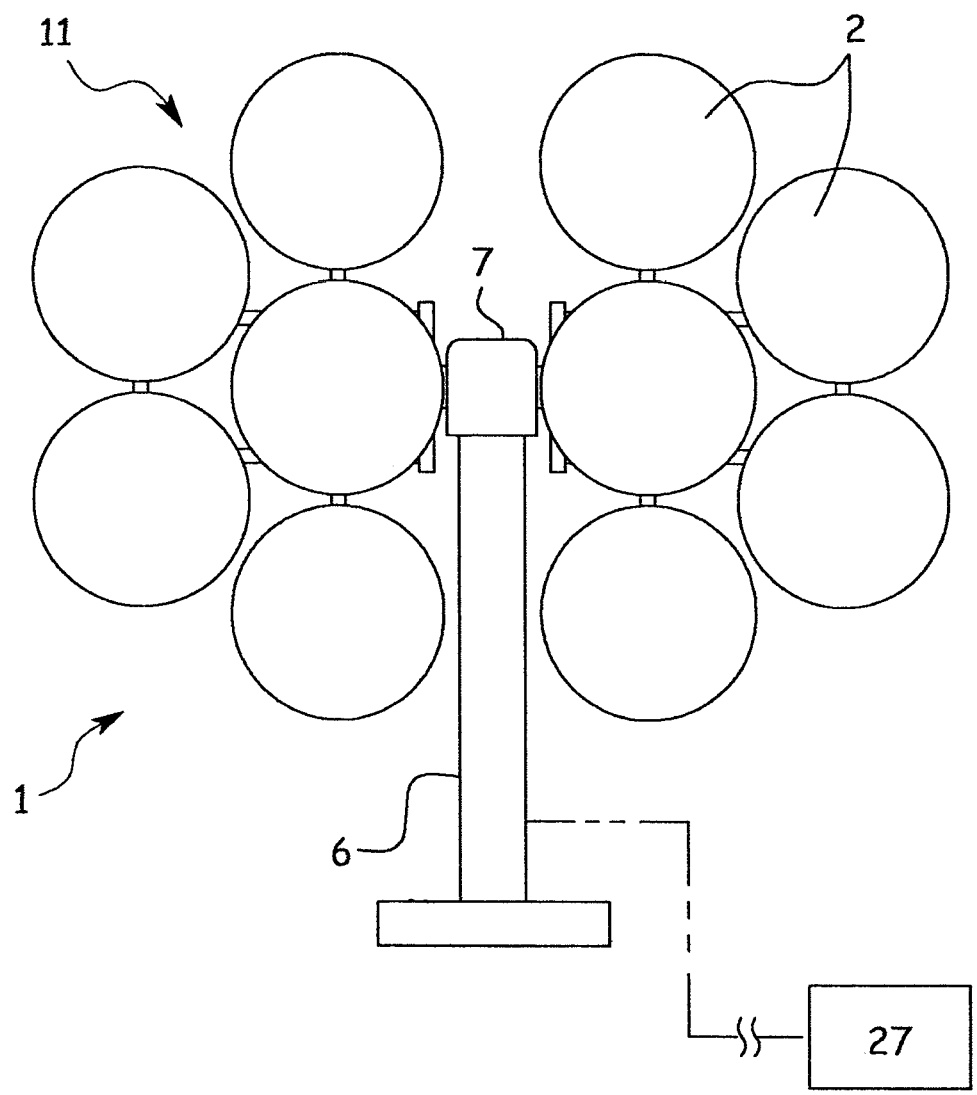
FIG. 1 is a front view illustrating a multi-mirror heliostat according to an embodiment of the present invention.
Figure 2:
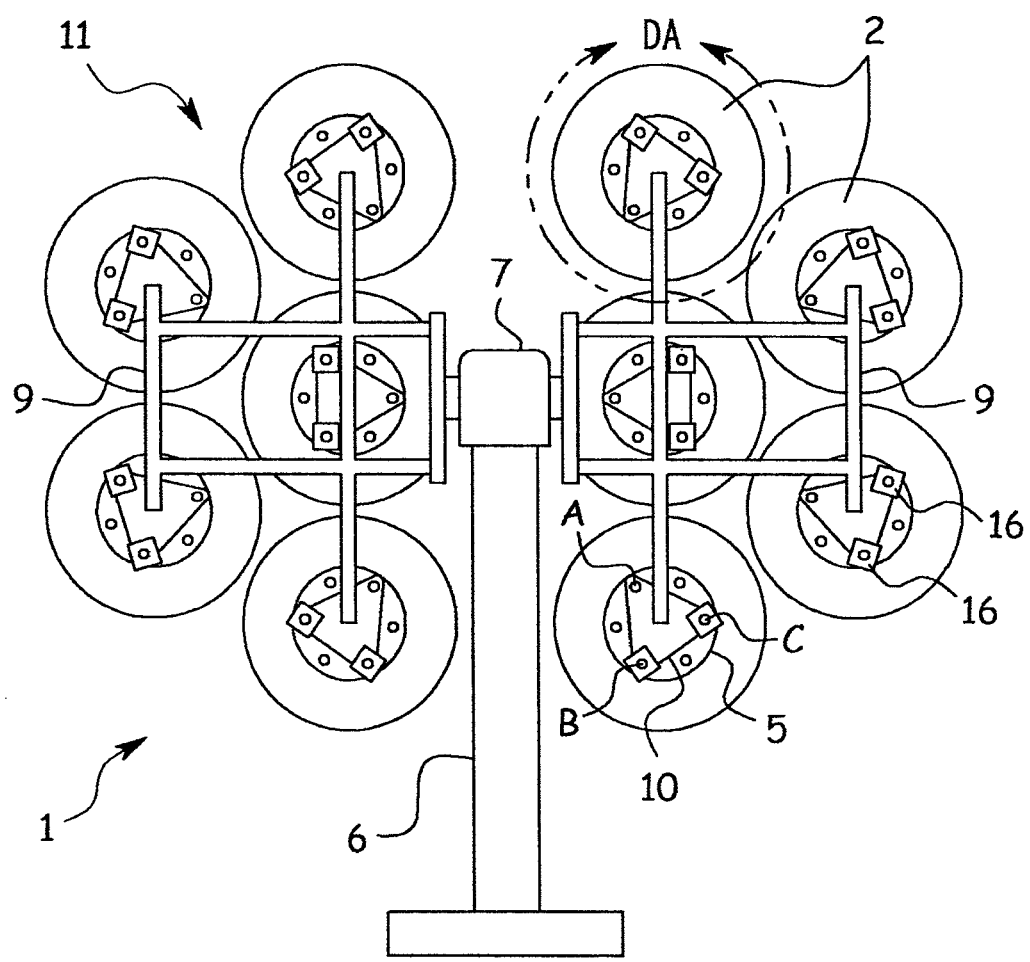
FIG. 2 is a back view illustrating the multi-mirror heliostat.
Figure 3:
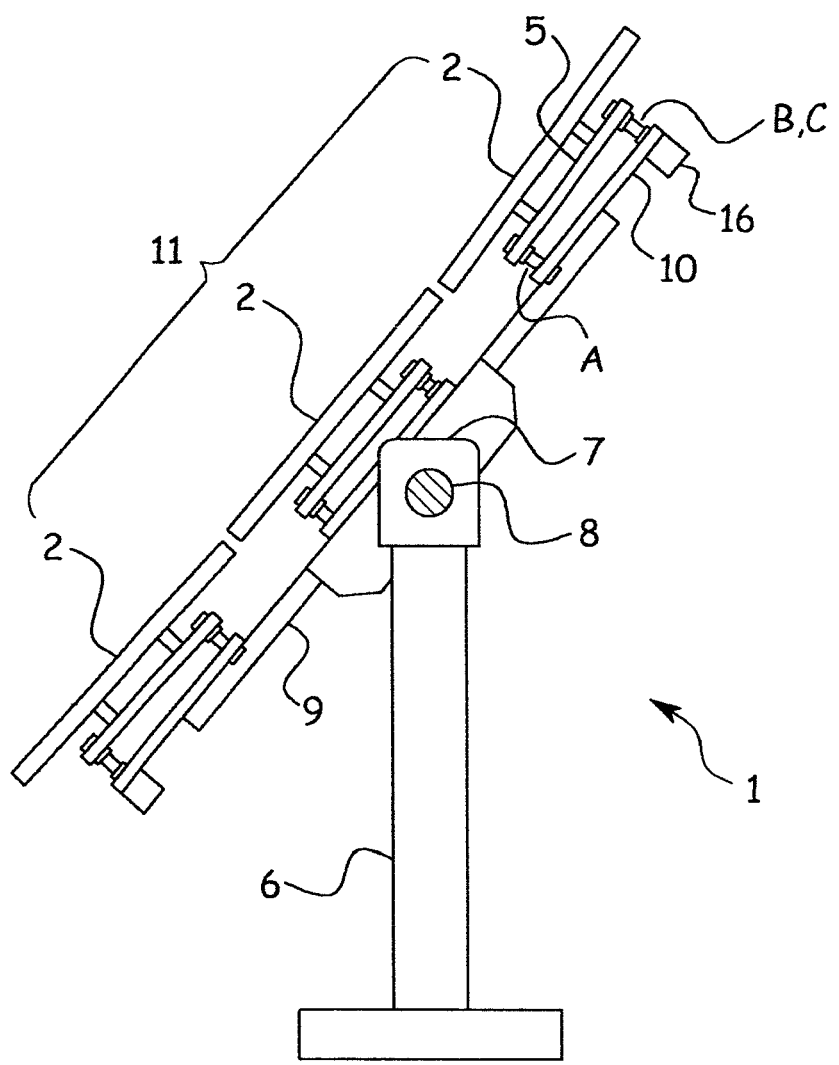
FIG. 3 is a side view illustrating the multi-mirror heliostat.
Figure 4:
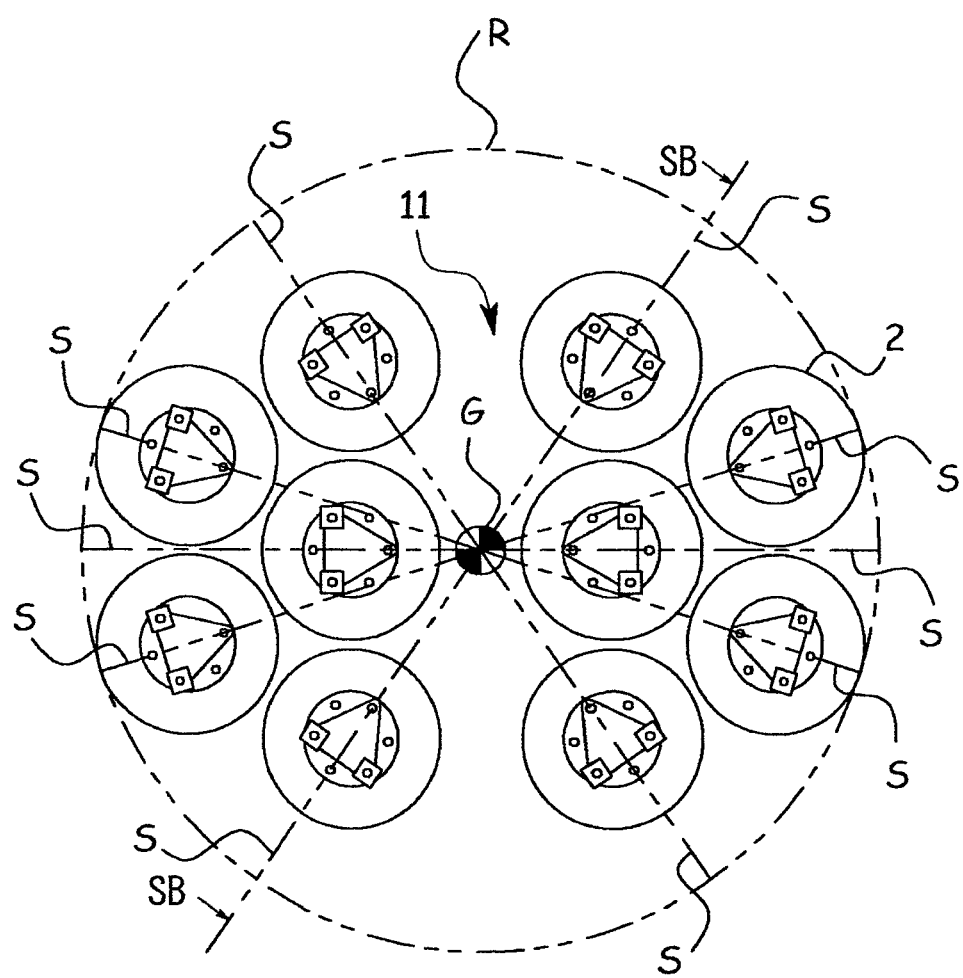
FIG. 4 is a view illustrating a circumcircle encircling mirrors of the multi-mirror heliostat.
Figure 5:
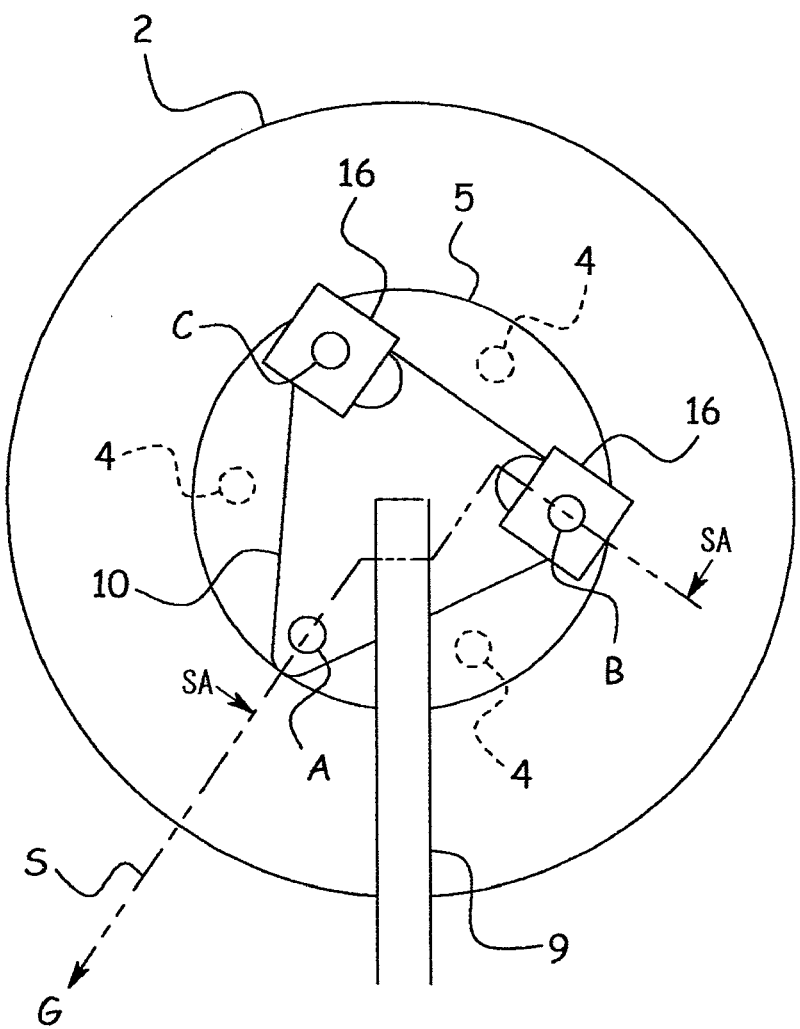
FIG. 5 is a back view illustrating a support structure of one (indicated with an arrow DA in FIG. 2) of the mirrors of the multi-mirror heliostat.
Figure 6:
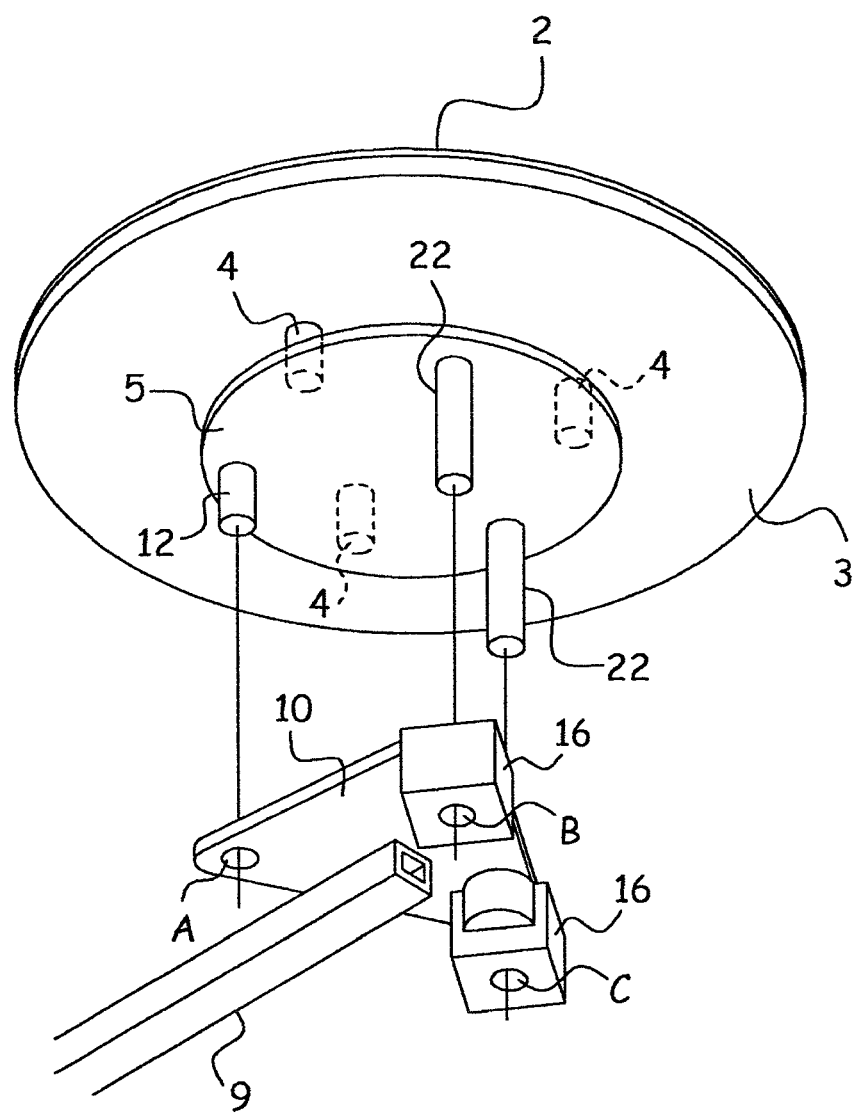
FIG. 6 is an exploded view illustrating the mirror support structure of FIG. 5.
Figure 7:
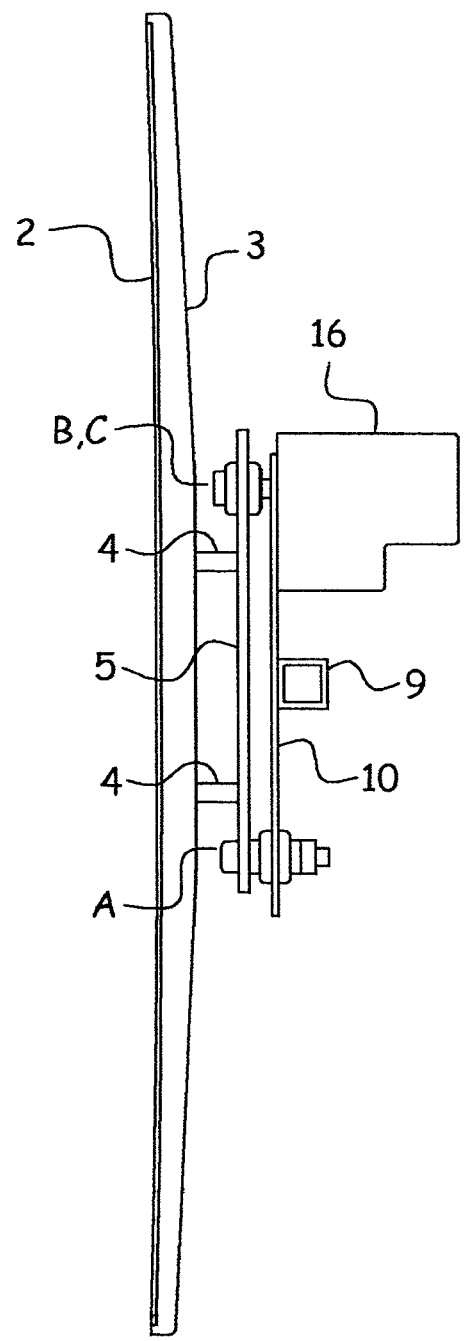
FIG. 7 is a side view illustrating the mirror.
Figure 12:
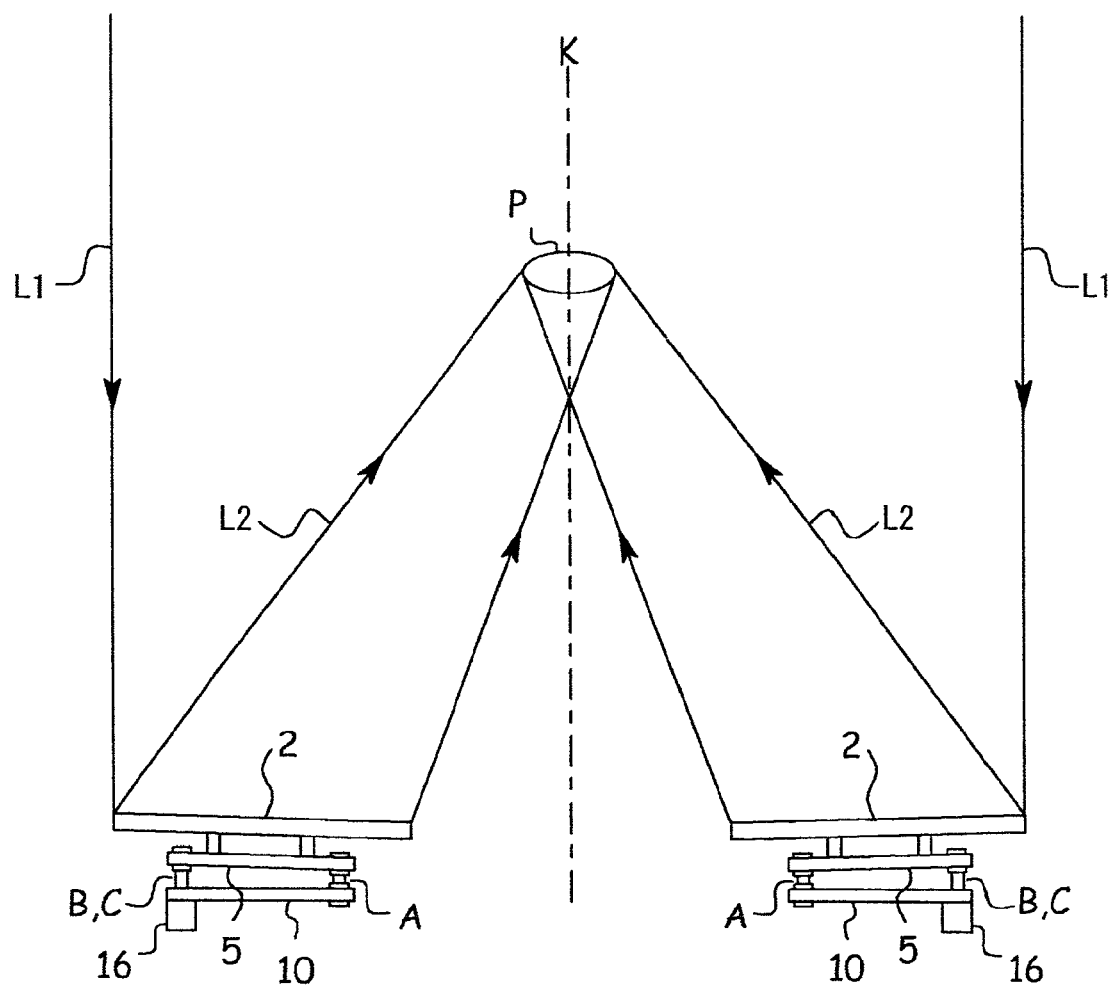
FIG. 12 is an explanatory view taken along a line SB-SB of FIG. 4 illustrating a light concentration state with sunlight being made incident in an optical axis direction.

First, an initial adjustment of the heliostat 1 will be explained. When a number of heliostats 1 are installed in the field, the angle of each mirror 2 of each heliostat 1 must be adjusted so that reflected light L2 from the mirror 2 concentrates onto a focal position on an optical axis K of the mirror assembly 11 of the heliostat 1 in question. FIG. 12 is a diagonal section taken along a line SB-SB of FIG. 4 illustrating the mirrors 2 of the mirror assembly 11. In FIG. 12, sunlight L1 is made incident to the mirror assembly 11 in the direction of the optical axis K. At this time, reflected light L2 from every mirror 2 of the mirror assembly 11 must overlap at a single target position on the optical axis K. For this, the initial adjustment is carried out.

The initial adjustment of the heliostat 1 is manually carried out through the controller 27. Namely, a protruding quantity of the bolt 22 at each of the movable points B and C on each mirror 2 is controlled to adjust the angle of the mirror 2 so that reflected light L2 from the mirror 2 focuses onto the target position. This adjustment is visually carried out at high efficiency by using the electric extendable units 16 of the mirror 2 without actually touching the mirror 2.

According to the present embodiment, the mirror 2 is circular. Compared to a quadrilateral mirror, the circular mirror 2 is superior in profile irregularity and hardly causes distortion, to provide a light concentration spot P of complete circle having a clear contour. The light concentration spot P at a focal position is an image of the sun. The mirror 2 is a concave mirror to make the light concentration spot P smaller and realize a high concentration ratio. If the mirror 2 is a flat mirror having no focal point, reflected light itself from the flat mirror diffuses to form, at the above-mentioned focal position, a light concentration spot that is larger than the mirror itself. On the other hand, the mirror 2 that is concave provides reflected light that does not diffuse larger than the mirror 2 and concentrates at the focal position. Once the initial adjustment is completed, the mirror assembly 11 of the mirrors 2 defines a virtual curved surface serving as a single concave (spherical or paraboloidal) mirror.

Figure 10:
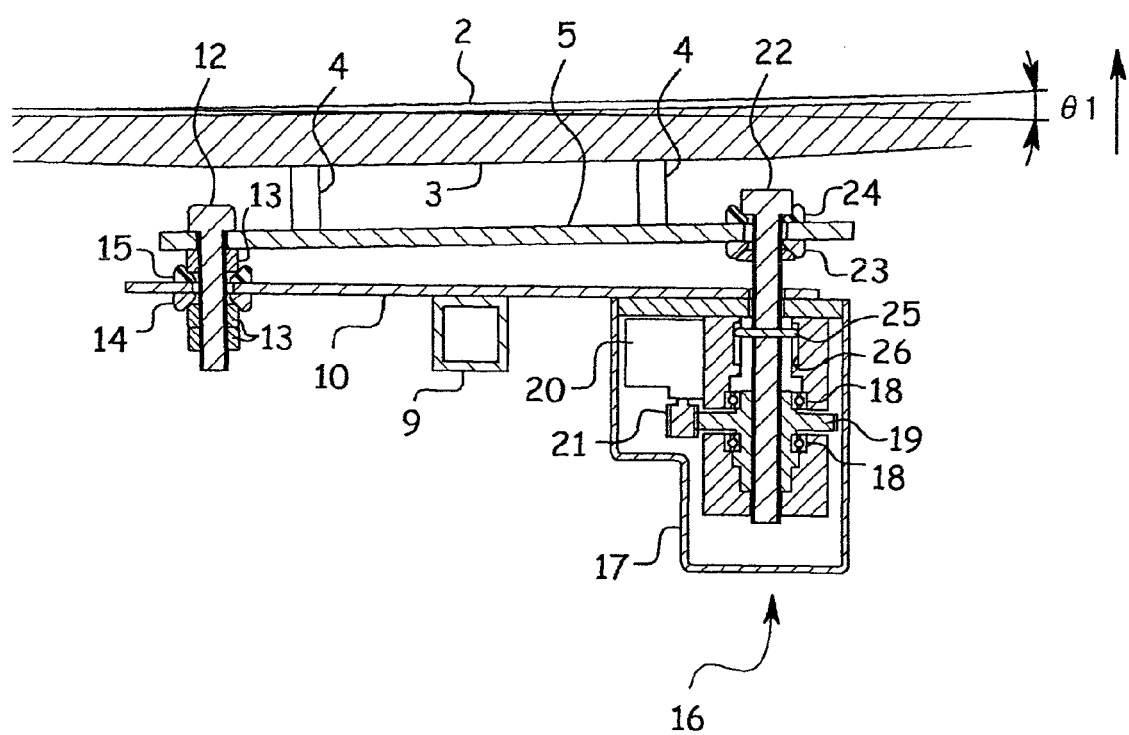
FIG. 10 is a sectional view corresponding to FIG. 8 and illustrating an initial adjustment of the mirror.

After the initial adjustment, each mirror 2 is higher on the movable points B and C sides by a predetermined angle theta-1 than on the fulcrum A side as illustrated in FIG. 10. Namely, the mirrors 2 are arranged in a Fresnel-mirror-like state on the same plane on the frame 9. The fulcrum A of each mirror 2 is positioned on the inner side, i.e., on the center G side with respect to the center of the mirror 2 so that the mirror 2 on the fulcrum A side comes nearer to the frame 9. This state stabilizes the attached condition of the mirror 2.

An aberration correcting adjustment of the heliostat 1 will be explained.

Figure 13:
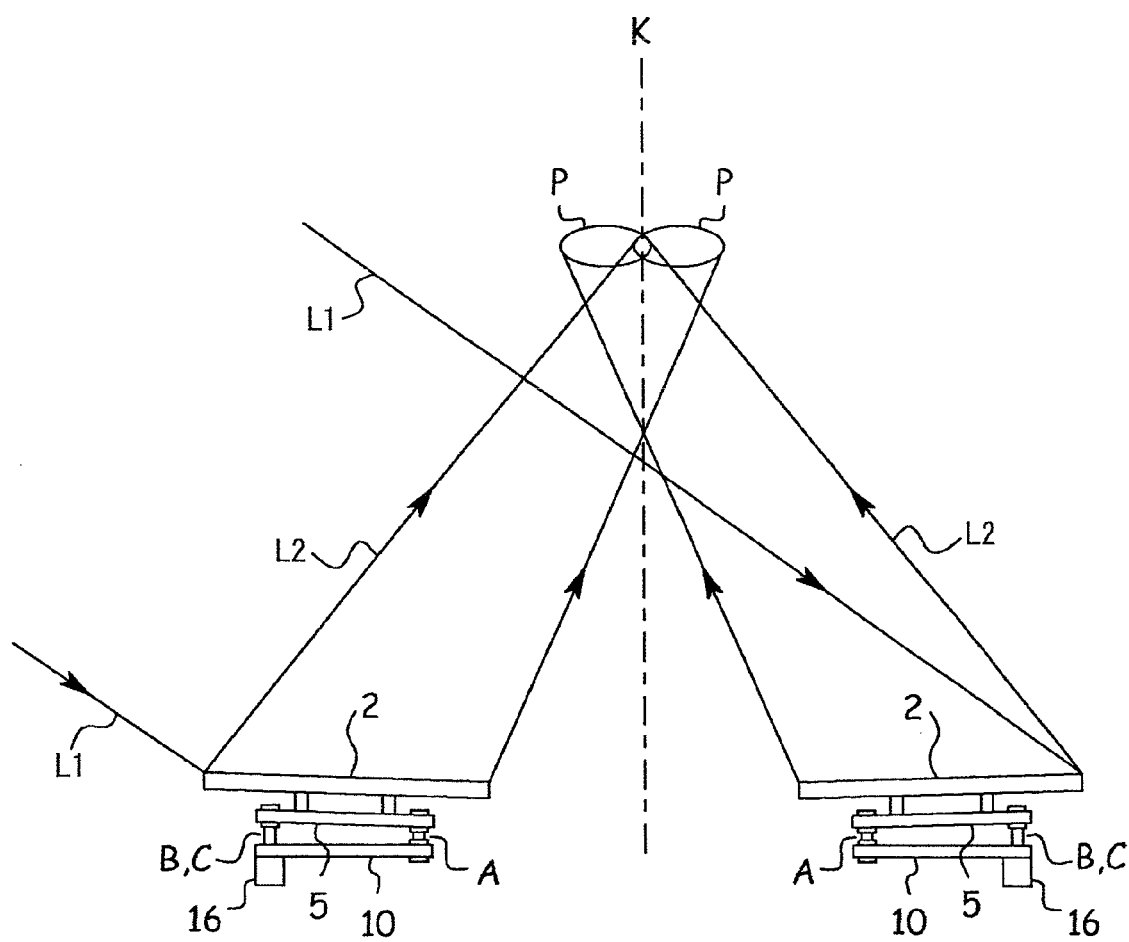
FIG. 13 is an explanatory view corresponding to FIG. 12 illustrating an aberration occurring state with sunlight being made incident in a direction other than the optical axis direction.
Figure 14:
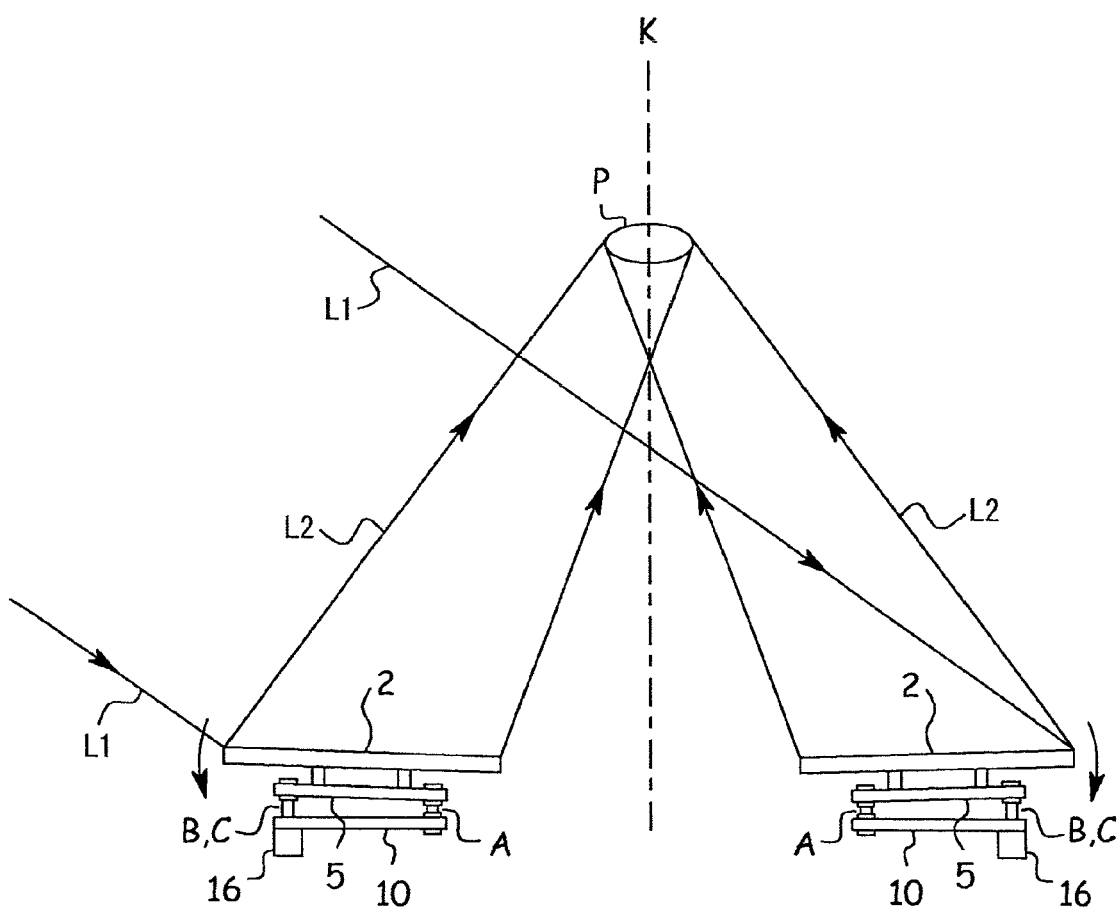
FIG. 14 is an explanatory view corresponding to FIG. 12 illustrating an aberration corrected state with sunlight being made incident in a direction other than the optical axis direction.

In FIG. 12, the light concentration spot P of every mirror 2 is adjusted to the target position. The mirror assembly 11 has a given size, and therefore, demonstrates optical characteristics as if the mirror assembly 11 is a single large concave mirror. If the sunlight L1 inclines to form a relatively large incident angle with respect to the optical axis K of the mirror assembly 11 and if no aberration correcting operation is carried out, an aberration occurs to inwardly direct an optical axis of the reflected light L2 of the mirror 2 as illustrated in FIG. 13. In this case, beams of the reflected light L2 from the mirrors 2 do not concentrate at the target position but cross each other to form light concentration spots P that are displaced from each other. These light concentration spots P form a large aggregation spot that partly spreads out of the target position.

The occurrence of such aberration is predictable according to data collected and recorded in advance. According to the recorded data and detected conditions such as the position of the heliostat 1, time, and season, the controller 27 estimates an aberration to occur and sends aberration correcting signals to the motors 20 at the movable points B and C of each mirror 2. In response to the signals, the motors 20 of the mirror 2 turn the nut gears 19 to adjust the protruding quantities of the respective bolts 22 of the mirror 2.

Figure 11:
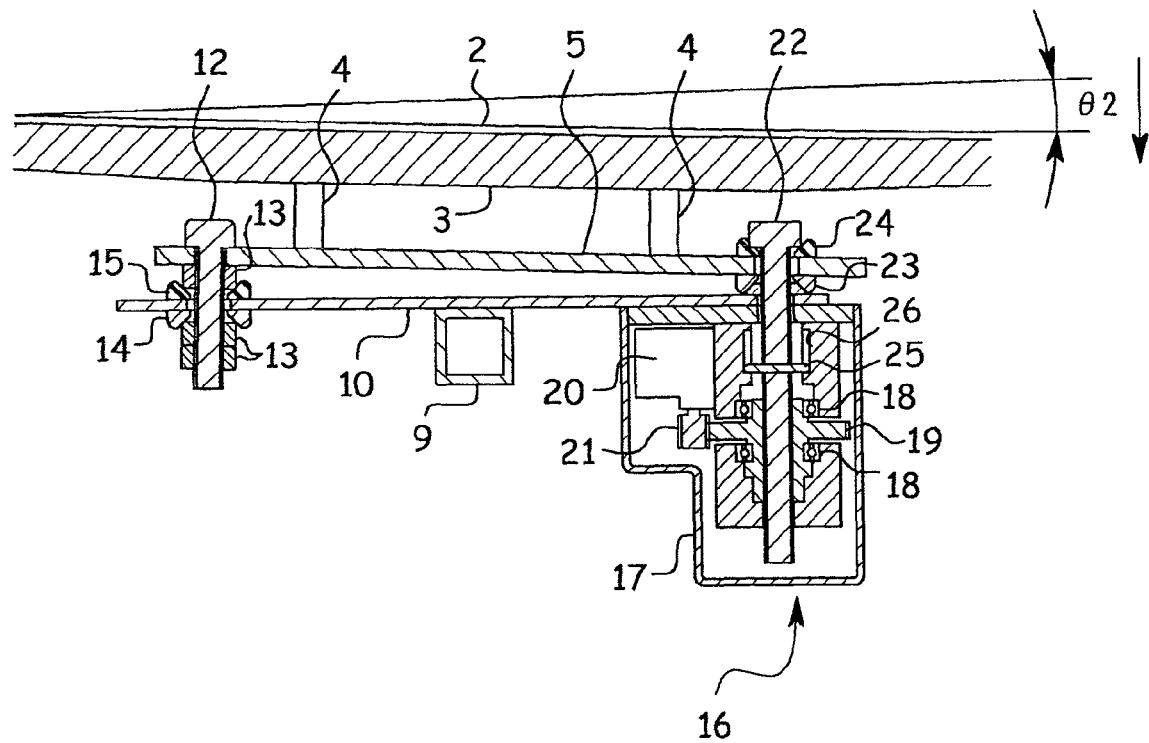
FIG. 11 is a sectional view corresponding to FIG. 8 illustrating an aberration correcting adjustment of the mirror.

As a result, the outer side of the mirror 2 is inclined toward the frame 9 by a given angle of theta-2 from the initial adjusted state (FIG. 10) as illustrated in FIG. 11, thereby preventing the aberration and maintaining the light concentration spot P of the mirror 2 at the target position. The aggregation of the spots P from the heliostat 1, therefore, concentrates onto the target position without coming off the target position. This corresponds to suppressing the aberration by deforming the virtual curved surface of the concave mirror defined by the mirror assembly 11.

The angles theta-1 and theta-2 for the initial adjustment and aberration correcting adjustment illustrated in FIGS. 10 and 11 are exaggerated for the sake of easy understanding. In practice, these angles are very small.

The reference line S illustrated in FIG. 4 passes over the midpoint between the movable points B and C on each mirror 2, and therefore, the angle of the mirror 2 is easily adjustable by controlling the protruding quantities of the bolts 22 at the movable points B and C. Namely, protruding the bolts 22 at the movable points B and C by the same quantity results in straightly inclining the mirror 2 with respect to the fulcrum A and protruding the bolts 22 by different quantities results in inclining and turning the mirror 2 around the reference line S. This configuration allows calculations for controlling an angle of the mirror 2 to be carried out easily.

The controller 27 continuously controls the electric extendable units 16 while the heliostat 1 is active by individually sending signals to the units 16. In response to the signals, the units 16 of each mirror 2 adjust distances between the mirror 2 and the frame 9 at the movable points B and C, thereby canceling an aberration of the mirror 2. The controller 27 turns the frame 9 according to the diurnal motion of the sun so that the optical axis K of the virtual concave mirror defined by the mirror assembly 11 is always oriented toward the target position and so that an aberration of the mirror assembly 11 caused by the diurnal motion and annual motion of the sun is always corrected. Even if the size of the mirror assembly 11 of the heliostat 1 is increased, the embodiment always properly adjusts the angle of each mirror 2 of the mirror assembly 11 according to an incident angle of the sunlight L1, to prevent an aberration and maintain a concentrated state of the reflected light L2.

According to the present embodiment, the heliostat 1 is of an altazimuth type. Instead, the heliostat 1 may be of any other type such as an equatorial type.

The number of the mirrors 2 installed in the heliostat 1 is not limited to ten. It may be 24 or over. In terms of balancing, it is preferable that the same even number of the mirrors 2 are arranged on each side of the support post 6.

According to the present embodiment, the mirrors 2 are arranged on the frame 9 substantially in the same plane at different angles to form a Fresnel-mirror-like configuration. It is possible that the mirrors 2 in the mirror assembly 11 are arranged to form an arc-like configuration with distances between the mirrors 2 and the frame 9 gradually increasing toward the outside of the mirror assembly 11.

According to the present embodiment, each mirror 2 is a concave mirror having a given focal distance. Instead, the mirror 2 may be a flat mirror.

According to the present embodiment, each mirror 2 is circular. Instead, the mirror 2 may have any other shape such as a quadrilateral and a hexagon.

According to the present embodiment, each mirror 2 has a diameter of 50 centimeters. The diameter may have any value, for example, 70 centimeters.

According to the present embodiment, the electric extendable unit 16 employs a bolt-nut mechanism. Instead, it may employ any other mechanism such as a link mechanism and an actuator mechanism.

In this way, the heliostat according to the present invention supports a plurality of mirrors with a frame each at three points including a fulcrum to support the mirror on the frame and two movable points to separately support the mirror on the frame through respective electric extendable units. A distance between each mirror and the frame at each of the movable points is separately controlled through the electric extendable unit, to vary an angle of the mirror in any direction. The angle of each mirror is changed according to an incident angle of sunlight, to cancel an aberration of the mirror, which is dependent on the incident angle of sunlight, so that the mirror reflects sunlight always onto a single target position. In this way, the present invention always cancels an aberration of each mirror, and therefore, is able to increase the size of the heliostat without causing the aberration problem.

The two movable points on each mirror are equidistant from a reference line extending radially from the center of the mirror assembly. Accordingly, the angle of each mirror is easily adjustable.

Compared with the movable points of each mirror, the fulcrum of the mirror is on the center side of a circumcircle of the mirror assembly and the fulcrum side of the mirror is generally set to be lower than the movable point side thereof. Namely, the fulcrum side comes in the vicinity of the frame, and therefore, the mirror is stably supported with the frame.

The mirror is concave. Compared with a flat mirror, the concave mirror provides a smaller light concentration spot but easily causes an aberration. The present invention is capable of surely correcting the aberration and concentrating reflected light from each mirror of the mirror assembly into a small spot. Namely, the present invention is capable of fully utilizing the advantages of the concave mirror.

According to the present invention, each mirror is circular. Compared with, for example, a quadrilateral mirror, the circular mirror provides a higher surface accuracy and a light concentration spot having a clear contour. The circular mirror, however, easily causes an aberration. The present invention is capable of surely canceling the aberration and concentrating reflected light from each mirror of the mirror assembly into a small spot having a clear contour. Namely, the present invention is capable of fully utilizing the advantages of the circular mirror.

This patent application claims the benefit of priority under 35 U.S.C. 119(a) to Japanese Patent Application No. 2013-268892 filed on Dec. 26, 2013 whose disclosed contents are incorporated by reference herein.

What is claimed is:

1. A multi-mirror heliostat including a mirror assembly and a frame that supports the mirror assembly and is turned and swung according to movement of the sun so that the mirror assembly continuously reflects and concentrates sunlight onto a predetermined position on an optical axis of the mirror assembly, the heliostat comprising:
   mirrors arranged to constitute the mirror assembly, each of the mirrors being supported on the frame at three points including a fulcrum and two movable points; and
   extendable units arranged at the movable points on each mirror, respectively, wherein
   the extendable units are separately controlled to individually change distances between the mirror and the frame at the movable points, thereby adjusting an angle of the mirror.

2. The multi-mirror heliostat of claim 1, wherein
the fulcrum and a midpoint between the movable points on each mirror are positioned on a reference line extending radially from a center of the mirror assembly.

3. The multi-mirror heliostat of claim 2, wherein
the fulcrum on each mirror is on a center side of the mirror assembly with respect to the center of the mirror.

4. The multi-mirror heliostat of claim 1, wherein each mirror is a concave mirror.

5. The multi-mirror heliostat of claim 1, wherein each mirror is circular.

* * * * *